Figure 1:
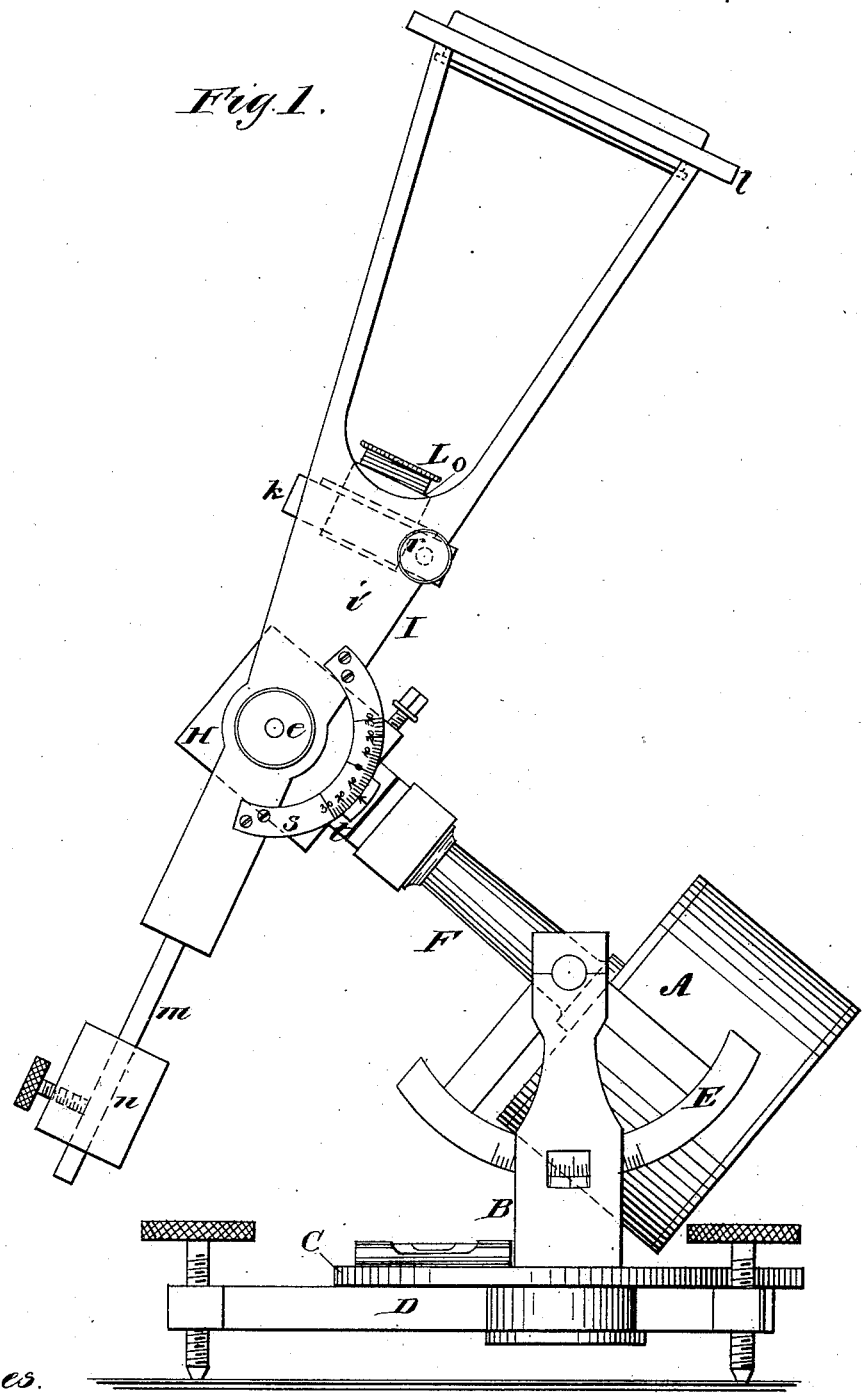

(No Model.)

A. M. MAYER.
HELIOSTAT.

No. 333,769. Patented Jan. 5, 1886.

Witnesses.
H. F. Parker
H. C. Hagen.

Inventor.
A. M. Mayer
By Geo. M. Hopkins,
Atty.

(No Model.)  2 Sheets—Sheet 2.
A. M. MAYER.
HELIOSTAT.
No. 333,769.  Patented Jan. 5, 1886.
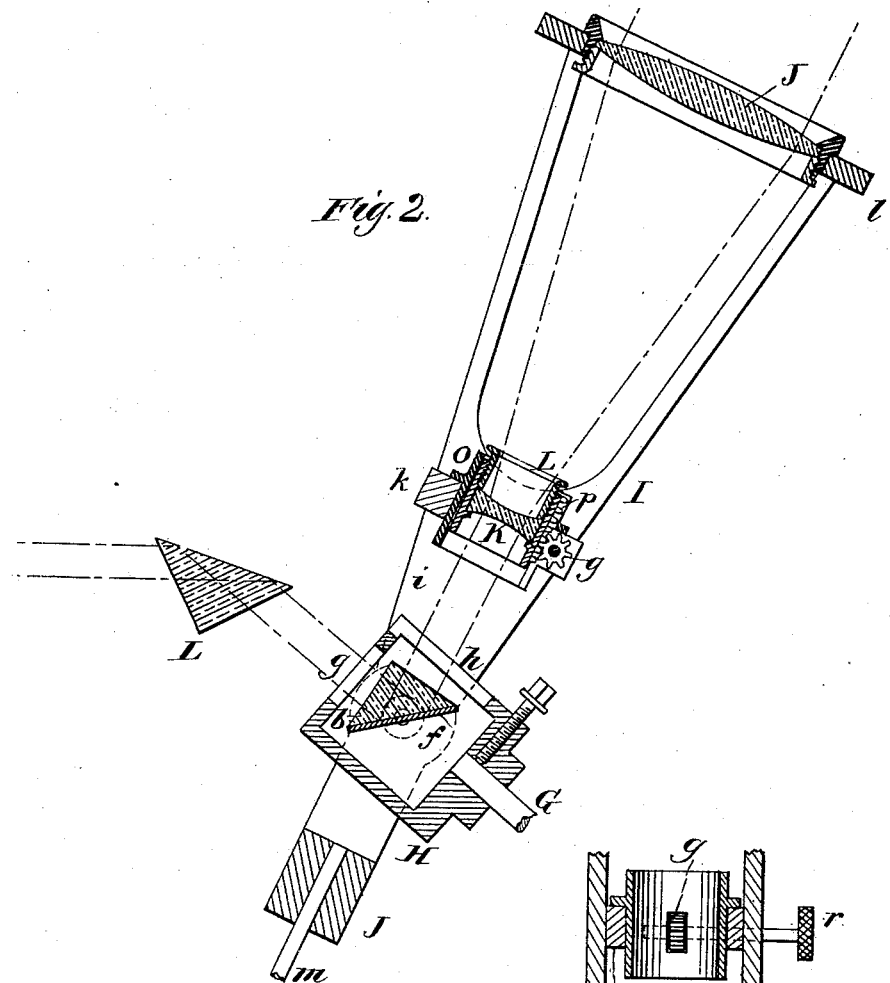
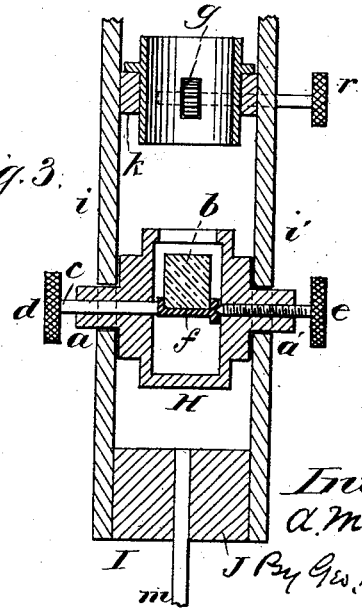
Witnesses.
H. F. Parker.
H. C. Hagen.
Inventor.
A. M. Mayer
By Geo. M. Hopkins
Atty

UNITED STATES PATENT OFFICE.

ALFRED M. MAYER, OF SOUTH ORANGE, NEW JERSEY.

HELIOSTAT.

SPECIFICATION forming part of Letters Patent No. 333,769, dated January 5, 1886.

Application filed September 11, 1885. Serial No. 176,778. (No model.)

*To all whom it may concern:*

Be it known that I, ALFRED M. MAYER, of South Orange, in the county of Essex and State of New Jersey, have invented a new and useful Improvement in Heliostats, of which the following is a specification, reference being had to the annexed drawings, forming a part thereof, in which—

Figure 1 is a side elevation. Fig. 2 is a vertical transverse section, and Fig. 3 is a vertical section taken on a plane at right angles to the section shown in Fig. 2.

Similar letters of reference indicate the same parts in the different figures of the drawings.

The common form of heliostat consists of a plane mirror carried by a driving-clock, so as to maintain a solar beam continuously in one direction. The plane mirror has to be of considerable size, and for accurate work is costly. The plane mirror and the mechanism required to insure a constant direction of the reflected light are so heavy and require so many joints, involving friction and dead-centers, as to render it difficult to move them with a perfectly uniform motion.

My invention is designed to avoid these and other difficulties and imperfections common to the ordinary heliostat, and to provide a compact, simple, and inexpensive instrument which will maintain a parallel, convergent, or divergent solar beam in one direction with perfect steadiness, and which will produce an illuminated field of uniform intensity with an amount of heat very much less than that given by the forms of instruments heretofore used.

My invention consists in a lens, which may be achromatic or not, for receiving the light and producing a convergent beam, a concave lens for parallelizing the convergent rays, and a reflector consisting of a totally reflecting prism or a plane mirror, or a prism silvered on its reflecting-surface, all arranged upon a common axis in suitable frame-work adjustable to the sun's declination, and carried by a driving-clock.

The driving-clock A is mounted in pillars B B, which rise from the circular base C, the base C being pivoted to the center of the tripod D, and made adjustable horizontally, and provided with means for leveling and locating it coincident with the meridian-line of the place in which the instrument is used. A graduated arc of latitude, E, is secured to the clock, which is read through an opening in the pillar B, adjacent to the arc, and serves to adjust the axis of the clock parallel with the axis of the earth. A fixed tubular stem, F, projects from the center of the clock and incloses the central arbor, G, of the clock, which turns once in twenty-four hours.

The driving mechanism above described is common to several heliostats, and forms no part of my invention, except as it enters into combination with my devices.

Upon the arbor G is placed the prism-case H, which is clamped on the arbor by a set-screw to insure its positive movement, but which may be released to admit of turning it on the arbor for the purpose of adjustment. Hollow trunnions $a$ $a'$ project from opposite sides of the case H, at right angles with the arbor G and the axis of rotation of the case.

Within the case H is placed in the present case a reflecting-prism, $b$, supported by a spindle, $c$, extending through the trunnion $a$, and provided with a milled head, $d$, by which the prism may be turned. An adjusting-screw, $e$, projects through the trunnion $a'$ axially in line with the spindle $c$, and enters a conical cavity in the mounting of the prism, pressing against the mounting sufficiently to hold the prism in any position in which it may be placed. The reflecting-surface $f$ of the prism lies in the axis of the spindle, and in a plane exactly at right angles with its plane of rotation. There is an opening, $g$, in the side of the case H opposite to the arbor G, for the emergence of the reflected beam, and in the upper surface of the case H there is an opening, $h$, for receiving the incident beam.

Mounted on the trunnions $a$ $a'$ is a frame, I, composed of the forked side pieces, $i$ $i'$, cross-pieces $j$ $k$, and the annular end piece, $l$. The cross-piece $j$ is provided with a rod, $m$, projecting downward axially from the frame I, and carrying an adjustable weight, $n$, for counterbalancing the parts of the frame I above the trunnions $a$ $a'$.

In the annular end piece, $l$, is secured a lens, J, which is capable of rendering the parallel rays of the sun convergent. This lens may be either achromatic or not, and it may be either bi-convex, plano-convex, or it may have any other desirable form.

Within the focus of the lens J is placed a converging or diverging lens, K, for obtaining either parallel converging or diverging emergent rays. The tube L, in which the lens K is placed, slides in a tube, O, secured in the cross-piece k of the frame I. For the adjustment of this lens, the tube L is provided with a rack, p, which is engaged by a pinion, q, journaled in the frame I, and provided with a milled head, r, by which it may be turned. The lenses J K of the prism b are axially in line, and the adjustment of the lens K permits of focalizing, so as to secure the desired character of emergent beam.

It is obvious that I may employ a plane mirror instead of the prism, and that the mirror may be silvered on either of its surfaces.

A graduated declination-arc, s, is secured to the frame I concentric with the trunnions a a', and an index, t, projects from the case H over the edge of the arc. This arrangement of the arc and index permits of adjusting the frame I and lenses J K at the proper elevation without experiment when the declination of the sun is known.

To direct the beam of light to the place of use, I employ an auxiliary reflector, L, which may be a prism or plane mirror.

My improved heliostat is adapted to microscopic and spectroscopic work, to projection with the lantern, and to all uses to which the ordinary heliostat is applicable, besides being so equable in its operation as to permit of applying it to all the finer investigations requiring an instrument of this character.

Having thus described my invention, what I claim as new, and desire to secure by Letters Patent, is—

1. In a heliostat, the combination of a converging lens, a lens for rendering the convergent rays parallel, convergent, or divergent, a reflector placed at the intersection of the axis of the lenses and the polar axis, or the axis of the clock-work rotating the frame, an equatorial mounting supporting the lenses and reflector, and driving mechanism for maintaining the direction of the lenses, substantially as herein specified.

2. In a heliostat, a converging lens, a lens for rendering the convergent rays either parallel, convergent, or divergent, an adjustable reflector arranged coaxially with the lenses, and at the center of rotation of the frame carrying the large converging lens, and means for supporting and moving the lenses, reflector, and their support, substantially as herein specified.

3. The combination, in a heliostat, of one or more lenses for concentrating solar rays, a reflector consisting of a right-angled prism, or its equivalent, and means for maintaining the direction of the axis of the concentrating lens or lenses, substantially as specified.

4. The combination, in a heliostat, of a system of lenses and a frame for supporting the same, a prism-case provided with trunnions for receiving the lens-carrying frame, an adjustable reflecting-prism located within the case, and a driving-clock adapted to carry the prism-case and lens-supporting frame, substantially as herein specified.

ALFRED M. MAYER.

Witnesses:
GEO. M. HOPKINS,
H. C. HAGEN.